United States Patent
Johanneck

(10) Patent No.: US 9,010,772 B2
(45) Date of Patent: Apr. 21, 2015

(54) APPARATUS AND METHODS FOR RELOCATING ASSEMBLED NON-PENETRATING ANCHORS

(71) Applicant: Garlock Safety Systems, Minneapolis, MN (US)

(72) Inventor: Stephen C. Johanneck, Robbinsdale, MN (US)

(73) Assignee: Garlock Safety Systems, Minneapolis, MN (US)

( * ) Notice: Subject to any disclaimer, the term of this patent is extended or adjusted under 35 U.S.C. 154(b) by 0 days.

(21) Appl. No.: 14/312,974

(22) Filed: Jun. 24, 2014

(65) Prior Publication Data

US 2014/0375003 A1    Dec. 25, 2014

Related U.S. Application Data

(60) Provisional application No. 61/838,362, filed on Jun. 24, 2013.

(51) Int. Cl.
*B62B 1/26* (2006.01)
*B62B 1/22* (2006.01)

(52) U.S. Cl.
CPC ...................................... *B62B 1/22* (2013.01)

(58) Field of Classification Search
USPC ........ 280/43.131, 47.17, 47.24, 47.33, 79.11, 280/79.5
See application file for complete search history.

(56) References Cited

U.S. PATENT DOCUMENTS

| | | | | | |
|---|---|---|---|---|---|
| 1,681,944 | A | * | 8/1928 | Marshall, Jr. | 414/457 |
| 1,870,097 | A | * | 8/1932 | Coller | 414/457 |
| 1,870,163 | A | * | 8/1932 | Behling | 414/449 |
| 4,826,388 | A | * | 5/1989 | Golding | 414/684.3 |

* cited by examiner

*Primary Examiner* — Hau Phan
*Assistant Examiner* — Bryan Evans
(74) *Attorney, Agent, or Firm* — Alan D. Kamrath; Kamrath IP Lawfirm, P.A.

(57) ABSTRACT

A carrier for an assembled fall hazard anchor includes a frame including a rear bar and first and second carrier handles connected to the rear bar to define a plane. Wheels are rotatably connected to opposite ends of the rear bar and located outwardly of the carrier handles. First and second abutments are secured to the rear bar intermediate the carrier handles and extend downward for a substantial portion of the radius of the wheels. A swiveling hook is located intermediate the carrier handles and at an adjustable spacing above the plane and spaced in front of the rear bar. With the carrier handles not pivoted by the user, the ring of the assembled anchor can be received in the swiveling hook. The swiveling hook with an adjusted spacing, the ring and the assembled anchor can be raised by pivoting the carrier handles about the rear bar.

20 Claims, 4 Drawing Sheets

APPARATUS AND METHODS FOR RELOCATING ASSEMBLED NON-PENETRATING ANCHORS

BACKGROUND

Apparatus and methods for lifting, transporting and relocating assembled non-penetrating anchors are shown and described.

Non-penetrating anchors 12 to provide fall protection for workers working at the edge of a roof or other fall hazards are in general use in industry. Generally, conventional anchors 12 include a plurality of individual weights 16 which are supported and carried by a frame 18 of any suitable type. Frame 18 includes suitable structure such as a ring 14 for attaching a safety lifeline thereto which in turn is connected to a harness worn by the worker. When moving conventional anchors 12 from one location to another, they need to be disassembled. After disassembling, all the component parts (as many as 20-30) need to be moved separately and then reassembled in the new location. Thus, a need exists for a unique carrier for lifting, transporting and relocating the assembled non-penetrating anchor 12 in one piece to a new location on the roof or other fall hazard.

SUMMARY

This need and other problems in the field of fall protection are solved by providing a carrier for lifting, transporting and relocating the assembled non-penetrating anchor in one piece to a new location. Particularly, a frame includes a rear bar and first and second carrier handles connected to the rear bar to define a plane. Wheels are rotatably connected to opposite ends of the rear bar and located outwardly of the first and second carrier handles. First and second abutments are secured to the rear bar intermediate the first and second carrier handles and extend downward for a substantial portion of the radius of the wheels. A swiveling hook is located intermediate the first and second carrier handles and above the plane and spaced in front of the rear bar and has an adjustable spacing from the plane. With the carrier handles not pivoted by the user, the ring of the assembled anchor can be received in the swiveling hook. The spacing of the swiveling hook can be adjusted, and the swiveling hook, the ring and the assembled anchor can be raised by pivoting the carrier handles about the rear bar.

The swiveling hook is pivotally connected to an adjuster clevis received in a tube having a handle nut threadably received thereon. The tube is intermediate the swiveling hook and the handle nut and is connected to a U-shaped support secured to the first and second carrier handles and extending therefrom to an elevation.

Each abutment includes a plate extending parallel to the carrier handles and extending from the rear bar for a substantial portion of the radius of the wheels. The rear bar extends through a hole in the plate and is fixed to a tab extending from the plate parallel to the rear bar and having a substantially shorter height.

Illustrative embodiments will become clearer in light of the following detailed description in connection with the drawings.

DESCRIPTION OF THE DRAWINGS

The illustrative embodiments may best be described by reference to the accompanying drawings where.

Figure 1:
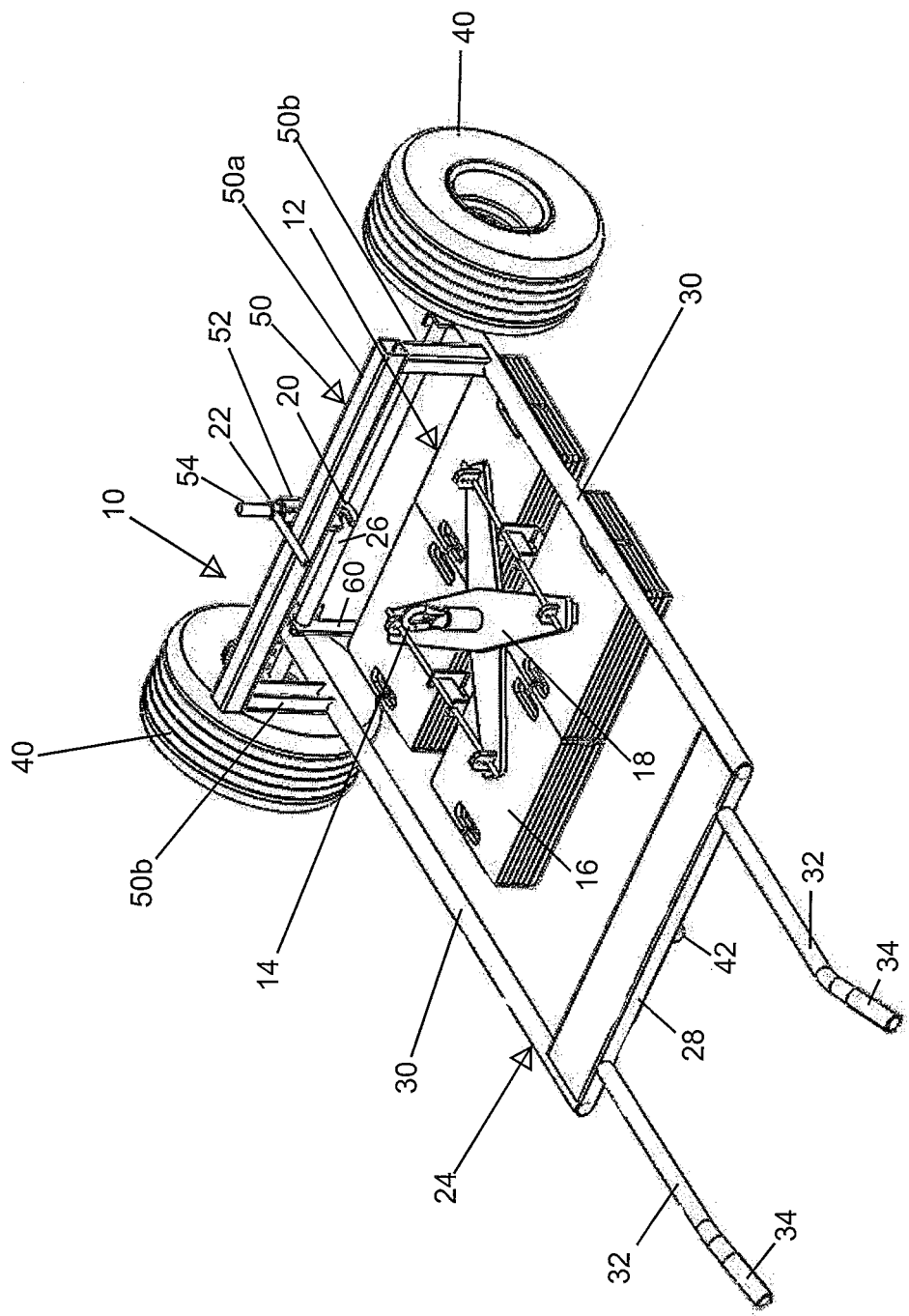
FIG. 1 shows a perspective view of a carrier approaching a non-penetrating anchor.
Figure 2:
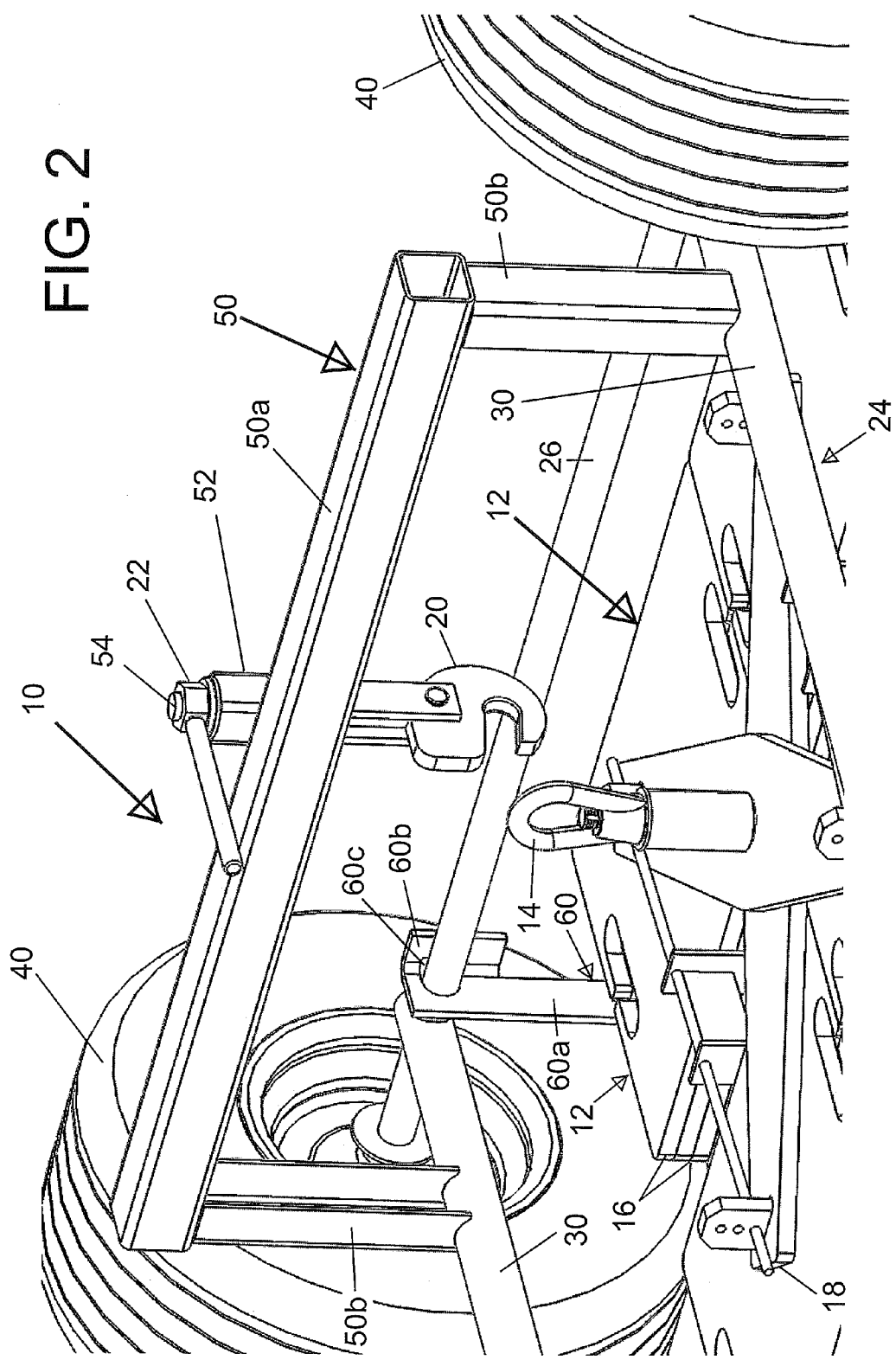
FIGS. 2-4 show partial, perspective views of the carrier approaching, attaching to, and lifting the non-penetrating anchor of FIG. 1.
Figure 3:
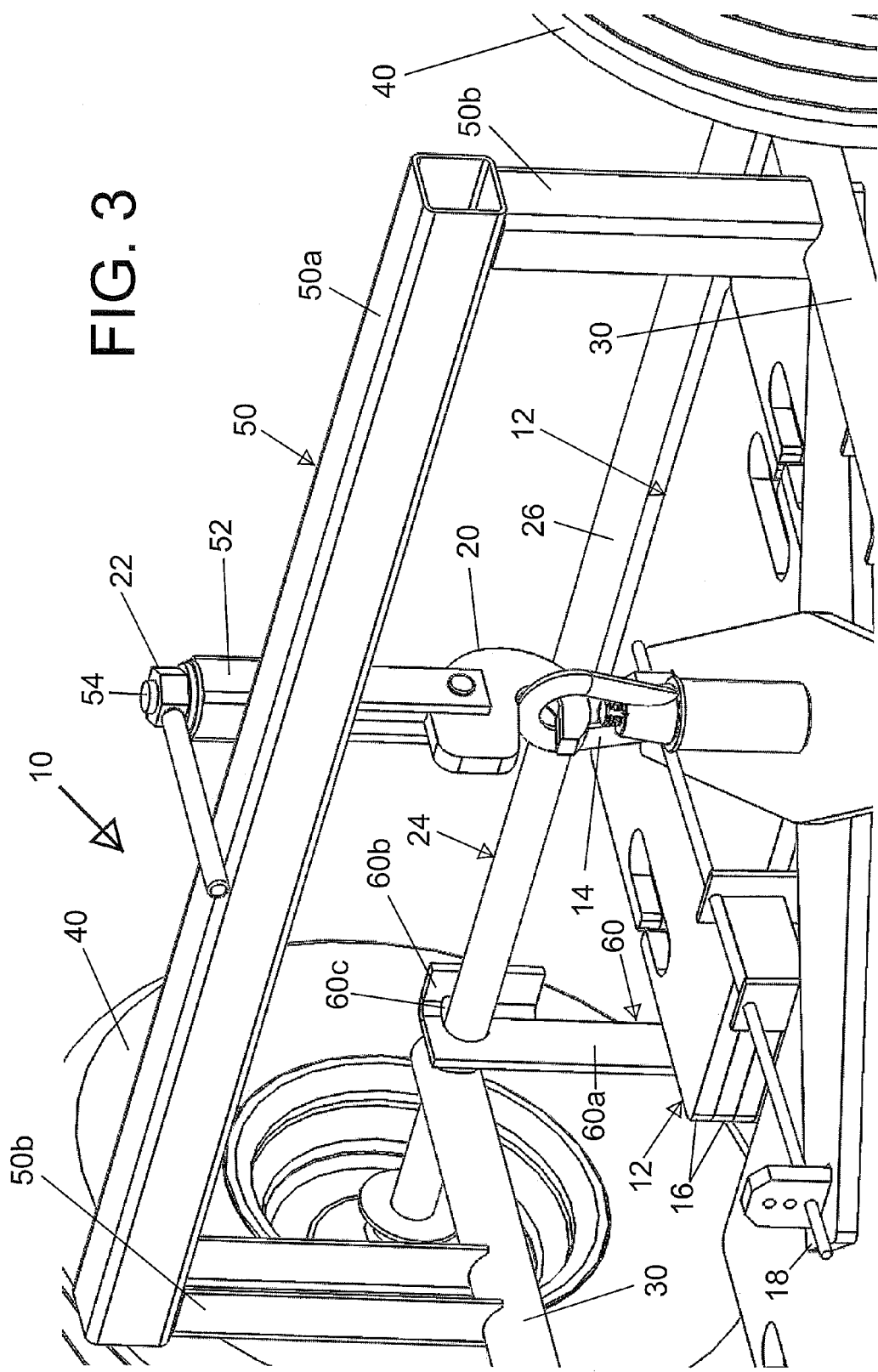
Figure 4:
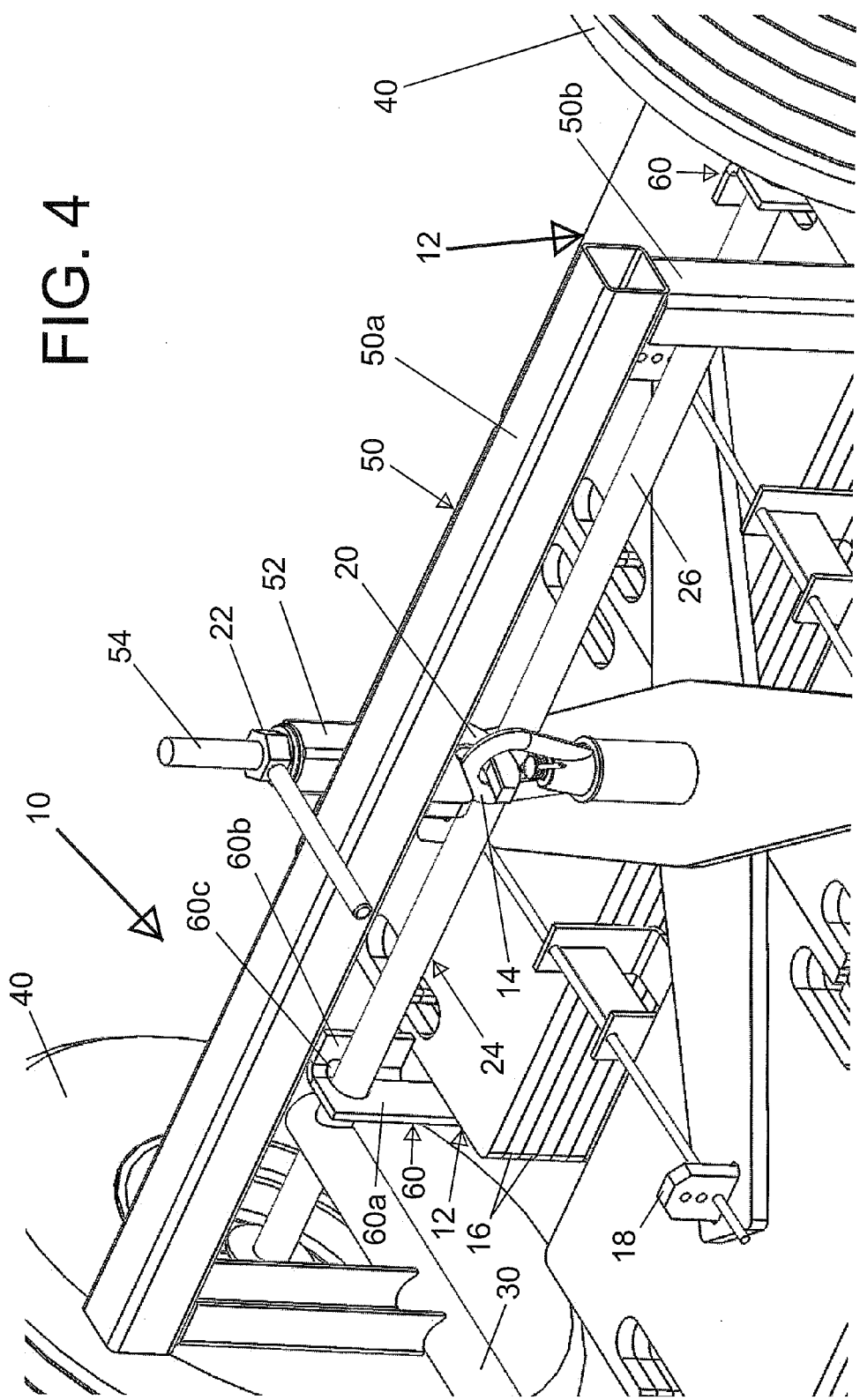

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A carrier 10 includes a generally rectangular frame 24 including a rear bar 26, a front bar 28 extending generally parallel to but spaced from rear bar 26, and carrier handles 30 extending generally perpendicularly between rear and front bars 26 and 28, with rear and front bars 26 and 28 and carrier handles 30 defining a plane. Rear and front bars 26 and 28 are spaced greater than a length of the assembled anchor 12. In the form shown, front bar 28 is in the form of a channel having U-shaped cross sections, carrier handles 30 are tubular having circular cross sections, while rear bar 26 is in the form of a solid rod of solid circular cross sections. Posts 32 generally project perpendicularly from front bar 28 initially in the plane of bars 26 and 28 and carrier handles 30 and include grips 34 extending at an obtuse angle downwardly at the free ends. Posts 32 are located intermediate first and second carrier handles 30 and in a parallel spaced relation. Posts 32 and hand grips 34 are tubular with circular cross sections.

Wheels 40 are rotatably mounted to the opposite ends of rear bar 26 outwardly of carrier handles 30. Wheels 40 each have a radius, and the spacing between wheels 40 is greater than the spacing between first and second carrier handles 30 and greater than the width of the assembled anchor 12. First and second carrier handles 30 are intermediate wheels 40 and have a spacing greater than the width of the assembled anchor 12 but less than the spacing of wheels 40. One or more lift rings 42 can be provided on the bottom of front bar 28 and extending opposite to U-shaped support 50 and adapted to be connected to a hoist line for lifting carrier 10 onto the roof or other fall hazard.

Carrier 10 further includes a swiveling hook 20 for engaging with and receiving ring 14 of anchor 12 and located intermediate first and second carrier handles 30 and spaced from rear bar 26. Suitable provisions movably support swiveling hook 20 relative to frame 24 to provide an adjustable spacing from the plane defined by rear and front bars 26 and 28 and carrier handles 30. In the form shown, a generally U-shaped support 50 is secured to first and second carrier handles 30 and extends from frame 24 intermediate bars 26 and 28 to an elevation opposite abutments 60 and the roof or other fall hazard and greater than the height of the assembled anchor 12. Particularly, support 50 includes a beam 50a extending generally parallel to and spaced from bars 26 and 28 and secured to carrier handles 30 by first and second braces 50b extending generally perpendicularly from the opposite ends of beam 50a. In the form shown, beam 50a and braces 50b are tubular having rectangular cross sections. A tube 52 is secured to beam 50a generally centrally between braces 50b and generally parallel thereto. Swiveling hook 20 is pivotally secured to an adjuster clevis 54, with a handle nut 22 threadly received on adjuster clevis 54 and located on the opposite side of tube 52 than swiveling hook 20. Swiveling hook 20 is located at the height of the assembled anchor 12 and in particular ring 14 thereof when first and second carrier handles 30 are in a normal position not pivoted by a user with grips 34 abutting the roof or other fall hazard upon which wheels 40 are located. First and second carrier handles 30 are pivotable about rear bar 26 from the normal position to a moving position, raising swiveling hook 20 relative to rear bar 26 opposite to abutments 60 and the roof or other fall hazard.

First and second abutments 60 are secured to rear bar 26 inside and adjacent to carrier handles 30 and extend toward but spaced from the roof or other fall hazard. In particular, abutments 60 extend for a distance from rear bar 26 which is a substantial portion of the radius of wheels 40 such as over 50% of the radius of wheels 40 and specifically less than the radius of wheels 40 so as not to engage the roof or other fall hazard on which wheels 40 are located but sufficient to present an obstacle to prevent the assembled anchor 12 from moving therebeyond. In the form shown, each abutment 60 includes a plate 60a extending parallel to first and second carrier handles 30, extending from rear bar 26, and having a plate height perpendicular to rear bar 26 for the substantial portion of the radius of wheels 40. A tab 60b extends generally perpendicular from plate 60a and parallel to rear bar 26. Tab 60a has a height perpendicular to rear bar 26 substantially shorter than the height of plate 60 and specifically about double the cross section of rear bar 26. A hole 60c extends through plate 60a adjacent to tab 60b, with rear bar 26 extending through hole 60c and fixed to tab 60b.

For the sake of explanation, it will be assumed that carrier 10 is spaced from anchor 12 and is resting upon a roof or other fall hazard such as being supported by wheels 40. The user steps between posts 32 and grasps grips 34 with his hands and pivots frame 24 about rear bar 26 extending along the rotation axis of wheels 40. Posts 32 and carrier handles 30 act as a lever in providing a mechanical advantage. With carrier 10 pivoted such that grips 34 are elevated, carrier 10 is positioned over an assembled non-penetrating anchor 12 and pulled back over the anchor 12 until swiveling hook 20 engages the ring 14 of the anchor 12. Carrier handles 30 are lowered until grips 34 rest upon the roof or other fall hazard. Then, the operator turns handle nut 22 on top of carrier 10 to lift the assembled anchor 12 off the roof or other fall hazard. The operator can then lift carrier handles 30 of the carrier 10 and move the assembled anchor 12 to a new location. In the event that the hooked assembled anchor 12 should rotate about an axis defined by adjuster clevis 54, the assembled anchor 12 will abut against one abutment 60 which will stop the assembled anchor 12 from rotating. After positioning the assembled anchor 12 where it needs to be, the operator lowers the carrier handles 30 until grips 34 rest upon the roof or other fall hazard, walks over to handle nut 22 on top of carrier 10 and turns handle nut 22 to lower the assembled anchor 12 back down on the roof or other fall hazard. The operator then moves carrier 10 forward to disengage swiveling hook 20 from ring 14 and moves the unloaded carrier 10 off to the side.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Carrier for an assembled anchor, with the assembled anchor having a width, a length, and a height, with the assembled anchor including a ring adapted to be connected to a safety lifeline, with the carrier comprising, in combination: a rear bar having opposite ends; wheels rotatably connected to the opposite ends of the rear bar and having a radius and a wheel spacing greater than the width of the assembled anchor; first and second carrier handles connected to the rear bar intermediate the wheels and extending generally perpendicular to the rear bar, with the first and second carrier handles having a handle spacing greater than the width of the assembled anchor but less than the wheel spacing, with the first and second carrier handles and the rear bar defining a plane; first and second abutments secured to the rear bar intermediate the first and second carrier handles and extending downward for a distance generally perpendicular to the rear bar and the first and second carrier handles and the plane, with the first and second abutments having an abutment spacing less than the handle spacing, with the distance being a substantial portion of the radius of the wheels; and a swiveling hook located intermediate the first and second carrier handles and spaced from the rear bar, with the swiveling hook having an adjustable spacing from the plane opposite to the first and second abutments, with the swiveling hook adaptable to receive the ring of the anchor, with the swiveling hook located at the height of the anchor when the first and second carrier handles are in a normal position when not pivoted by a user, with the first and second carrier handles pivotable about the rear bar from the normal position to a moving position raising the swiveling hook relative to the rear bar opposite to the first and second abutments.

2. The carrier of claim 1, further comprising, in combination: a U-shaped support secured to the first and second carrier handles and extending therefrom to an elevation opposite to the first and second abutments; a tube connected to the U-shaped support; an adjuster clevis received in the tube, with the swiveling hook pivotally connected to the adjuster clevis; and a handle nut threadably received on the adjuster clevis, with the tube located intermediate the swiveling hook and the handle nut.

3. The carrier of claim 2, wherein the U-shaped support comprises, in combination: a beam having opposite ends; and first and second braces extending from the opposite ends of the beam and extending perpendicularly between the beam and the first and second carrier handles, with the tube connected to the beam intermediate the first and second braces.

4. The carrier of claim 3, wherein the rear bar has solid circular cross sections and the first and second carrier handles are tubular with circular cross sections; and wherein the beam and the first and second braces are tubular with rectangular cross sections.

5. The carrier of claim 4, further comprising, in combination: a front bar extending generally perpendicularly between the first and second carrier handles parallel to the rear bar and having a spacing from the rear bar greater than the length of the assembled anchor.

6. The carrier of claim 5, wherein the front bar is a channel having U-shaped cross sections.

7. The carrier of claim 6, further comprising, in combination: a lift ring extending from a bottom of the channel opposite to the U-shaped support.

8. The carrier of claim 7, further comprising, in combination: a post extending from the front bar opposite to the rear bar and in the plane, with the post located intermediate the first and second carrier handles.

9. The carrier of claim 8, further comprising, in combination: a hand grip, with the post terminating in the hand grip, with the hand grip being at an obtuse angle to the post.

10. The carrier of claim 9, wherein the post and the hand grip are tubular with circular cross sections.

11. The carrier of claim 10, further comprising, in combination: another post extending from the front bar opposite to the rear bar and in the plane, with the other post located intermediate the first and second carrier handles, with the post and the other post in a parallel spaced relation.

12. The carrier of claim 11, further comprising, in combination: another hand grip, with the other post terminating in the other hand grip, with the other hand grip being at the obtuse angle to the other post.

13. The carrier of claim 12, wherein each abutment includes a plate extending parallel to the first and second carrier handles and extending from the rear bar, with the plate having a plate height perpendicular to the rear bar for a substantial portion of the radius of the wheels; a tab extending from the plate parallel to the rear bar and having a height perpendicular to the rear bar substantially shorter than the plate height; and a hole extending through the plate adjacent to the tab, with the rear bar extending through the hole and fixed to the tab.

14. The carrier of claim 1, further comprising, in combination: a front bar extending generally perpendicularly between the first and second carrier handles parallel to the rear bar and having a spacing from the rear bar greater than the length of the assembled anchor.

15. The carrier of claim 14, wherein the front bar is a channel having U-shaped cross sections.

16. The carrier of claim 15, further comprising, in combination: a lift ring extending from a bottom of the channel opposite to the swiveling hook.

17. The carrier of claim 14, further comprising, in combination: a post extending from the front bar opposite to the rear bar and in the plane, with the post located intermediate the first and second carrier handles.

18. The carrier of claim 17, further comprising, in combination: a hand grip, with the post terminating in the hand grip, with the hand grip being at an obtuse angle to the post.

19. The carrier of claim 1, wherein each abutment includes a plate extending parallel to the first and second carrier handles and extending from the rear bar, with the plate having a plate height perpendicular to the rear bar for a substantial portion of the radius of the wheels; a tab extending from the plate parallel to the rear bar and having a height perpendicular to the rear bar substantially shorter than the plate height; and a hole extending through the plate adjacent to the tab, with the rear bar extending through the hole and fixed to the tab.

20. The carrier of claim 1, further comprising, in combination: a tube mounted to the first and second carrier handles; an adjuster clevis received in the tube, with the swiveling hook pivotally connected to the adjuster clevis; and a handle nut threadably received on the adjuster clevis, with the tube located intermediate the swiveling hook and the handle nut.

\* \* \* \* \*